(12) United States Patent
Chang et al.

(10) Patent No.: US 9,996,871 B2
(45) Date of Patent: Jun. 12, 2018

(54) SYSTEMS, METHODS, AND MOBILE COMPUTING DEVICES FOR PURCHASE OF ITEMS AND DELIVERY TO A LOCATION WITHIN A PREDETERMINED COMMUNICATION RANGE

(71) Applicant: Toshiba Global Commerce Solutions Holdings Corporation, Tokyo (JP)

(72) Inventors: Ching-Tang Chang, Taipei (TW); Yi-Sheng Lee, Taipei (TW); Tsung-Hsien Lin, Taipei (TW); Wei-Yi Hsuan, Taipei (TW)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 637 days.

(21) Appl. No.: 14/515,472

(22) Filed: Oct. 15, 2014

(65) Prior Publication Data
US 2016/0110796 A1 Apr. 21, 2016

(51) Int. Cl.
G06Q 30/00 (2012.01)
G06Q 30/06 (2012.01)
G06Q 50/12 (2012.01)

(52) U.S. Cl.
CPC ..... *G06Q 30/0641* (2013.01); *G06Q 30/0623* (2013.01); *G06Q 30/0633* (2013.01); *G06Q 50/12* (2013.01)

(58) Field of Classification Search
CPC ...... G06Q 20/20–20/209; G06Q 30/06; G06Q 30/0601–30/0643; G06Q 30/08; G06Q 50/10; G06Q 50/12
See application file for complete search history.

(56) References Cited

U.S. PATENT DOCUMENTS 5,003,472 A 3/1991 Perrill et al.
6,425,524 B2 8/2002 Pentel
(Continued)

FOREIGN PATENT DOCUMENTS

CN 1627321 A 6/2005
CN 101742469 A 6/2010
(Continued)

OTHER PUBLICATIONS

Kumar, S. Vijaya et al., Menu Recommender to Enhance Customer Service and Improve Restaurant, International Journal of Engineering Research & Technology (IJERT), Sep. 2013, vol. 2 Issue 9.
(Continued)

*Primary Examiner* — William J Allen
(74) *Attorney, Agent, or Firm* — Olive Law Group, PLLC

(57) ABSTRACT

Systems, methods, and mobile computing devices for purchase of items and delivery to a location within a predetermined communication range are disclosed. According to an aspect, a mobile computing device includes a first communications module having a predetermined communication range and configured to receive an indication of one or more items for purchase and delivery to a location within the predetermined communication range. The mobile computing device also includes a user interface and an item ordering manager. The item ordering manager is configured to receive user input via the user interface for selecting one or more of the items for purchase and delivery to the location within the predetermined communication range. The item ordering manager is also configured to use the communications module to communicate identification of the one or more of the items to a second communications module within the predetermined communication range.

18 Claims, 4 Drawing Sheets

(56) References Cited

U.S. PATENT DOCUMENTS

| | | |
|---|---|---|
| 6,771,981 B1 | 8/2004 | Zalewski et al. |
| 7,299,007 B2 | 11/2007 | Eskin |
| 7,480,512 B2 | 1/2009 | Graham et al. |
| 7,580,678 B2 | 8/2009 | Byman-Kivivuori et al. |
| 7,835,946 B2 | 11/2010 | Goren et al. |
| 2002/0026364 A1 | 2/2002 | Mayer et al. |
| 2004/0015403 A1* | 1/2004 | Moskowitz ............ G06Q 30/06 705/26.61 |
| 2004/0143503 A1 | 7/2004 | Suthar |
| 2005/0088560 A1* | 4/2005 | Kalevo ................. H04N 5/232 348/333.01 |
| 2006/0085266 A1 | 4/2006 | Wei et al. |
| 2007/0088624 A1* | 4/2007 | Vaughn ................. G06Q 30/02 705/15 |
| 2007/0027696 A1 | 11/2007 | Burger |
| 2008/0208925 A1 | 8/2008 | Shum |
| 2009/0161734 A1 | 6/2009 | Stucki et al. |
| 2010/0117806 A1 | 5/2010 | Hong |
| 2011/0119132 A1 | 5/2011 | Morton et al. |
| 2012/0206391 A1 | 8/2012 | Kim et al. |
| 2012/0226568 A1 | 9/2012 | Hargraves et al. |
| 2012/0265623 A1* | 10/2012 | Zhu ........................ G06Q 30/06 705/16 |
| 2013/0024299 A1 | 1/2013 | Wong et al. |
| 2013/0057567 A1* | 3/2013 | Frank .................... G06F 3/1454 345/589 |
| 2013/0198081 A1* | 8/2013 | Royyuru .............. G06Q 20/322 705/44 |
| 2013/0211814 A1* | 8/2013 | Derks ................... G06Q 30/02 704/2 |
| 2013/0222698 A1* | 8/2013 | Sharma .................... G06F 3/14 348/581 |
| 2013/0226717 A1 | 8/2013 | Ahluwalia et al. |
| 2016/0078593 A1* | 3/2016 | Mesguich Havilio .... G06T 3/40 345/668 |
| 2016/0086585 A1* | 3/2016 | Sugimoto .............. G09G 5/391 345/668 |
| 2017/0124511 A1* | 5/2017 | Mueller ............. G06Q 10/0837 |

FOREIGN PATENT DOCUMENTS

| | | |
|---|---|---|
| WO | 2011/112937 A3 | 9/2011 |
| WO | 2013/022177 A1 | 2/2013 |
| WO | 2013/130279 A1 | 9/2013 |

OTHER PUBLICATIONS

Newman, Jared, New Order-By-Phone Restaurant Will Prep Your Food as You Get Closer, Website URL: http://techland.time.com/2011/06/01/new-order-by-phone-restaurant-will-prep-your-food-as-you-get-closer/, accessed Jun. 1, 2011.

Interactive Dining: RFID Menu and Live King Crab—YouTube, http://www.youtube.com/watch?v=lXd867XwkCl, accessed Nov. 12, 2013.

* cited by examiner

SYSTEMS, METHODS, AND MOBILE COMPUTING DEVICES FOR PURCHASE OF ITEMS AND DELIVERY TO A LOCATION WITHIN A PREDETERMINED COMMUNICATION RANGE

FIELD

Embodiments described herein relate to purchase systems. More particularly, embodiments described herein relate to systems, methods, and mobile computing devices for purchase of items or services and delivery to a location within a predetermined communication range.

BACKGROUND

Conventionally, restaurant guests or consumers purchase items or services within a restaurant or "brick and mortar" retail store by interacting with a person employed at the restaurant or store. In a restaurant for example, a waiter or waitress typically provides a menu to a guest and subsequently the guest will verbally place an order with the waiter or waitress. Most often, the order placement process will be efficient and without error. However, sometimes it may require an inconvenient amount of time for the order to be placed. The order may also be returned incorrectly to thereby result in additional time needed to place and return the correct order. For at least these reasons, it is desired to provide improved systems and techniques for conveniently and efficiently placing orders in restaurants and "brick and mortar" retail stores.

BRIEF DESCRIPTION OF THE DRAWINGS

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed.

DETAILED DESCRIPTION

Figure 1:
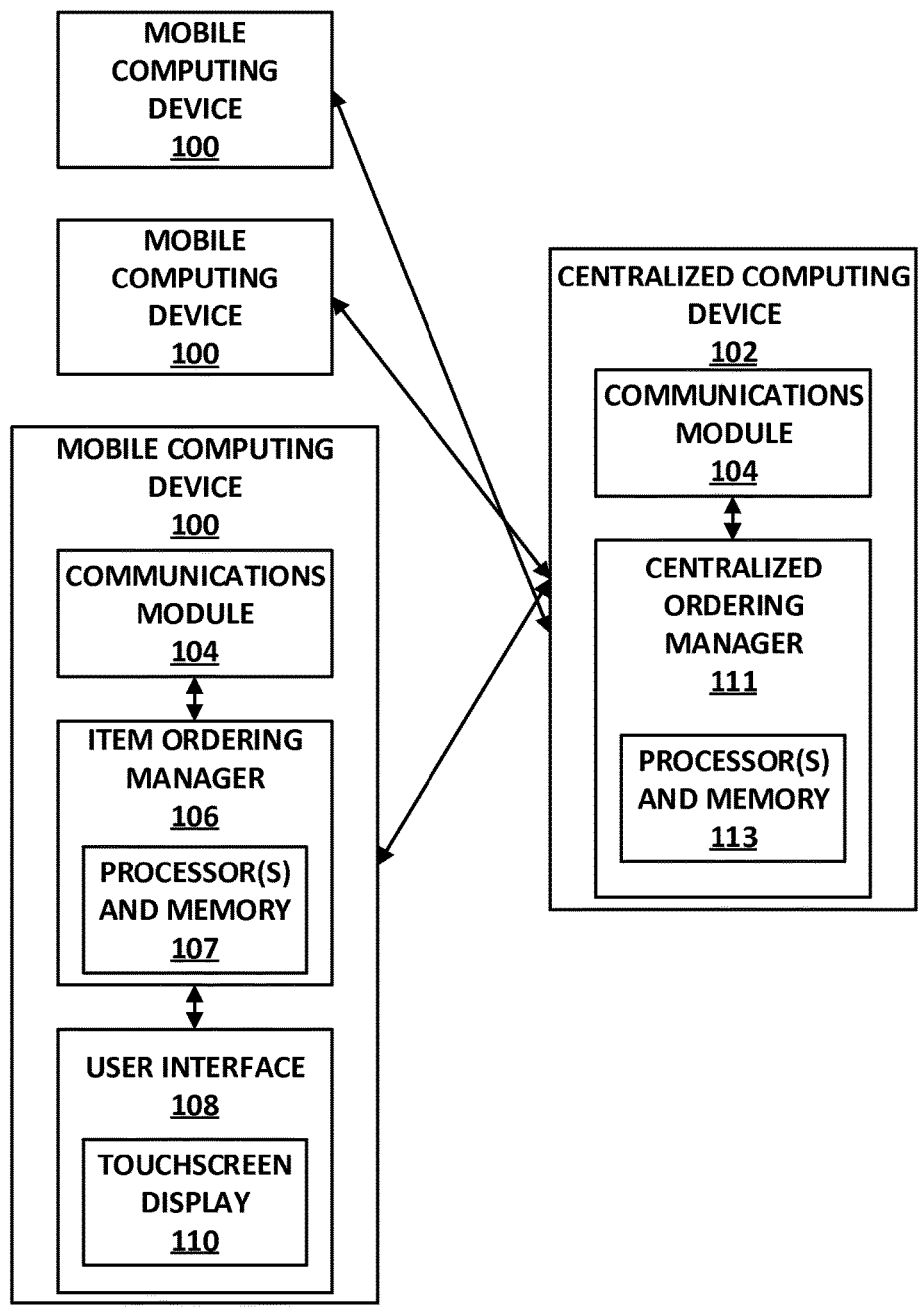
FIG. 1 is a block diagram of an example system for purchase of items and delivery to a location within a predetermined communication range in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present invention. A computing device may be, for example, retail equipment such as POS equipment. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD). A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

FIG. 1 illustrates a block diagram of an example system for purchase of items and delivery to a location within a predetermined communication range in accordance with embodiments of the present disclosure. Referring to FIG. 1, the system includes mobile computing devices 100 and a centralized computing device 102. The mobile computing devices 100 may include a communications module 104, an item ordering manager 106, and a user interface 108. The communications module 104 may have a predetermined communication range. For example, the communications module 104 may be a near field communications (NFC) module operable to establish radio communication with another NFC module in accordance with a suitable NFC techniques. The communications range of the communications module 104 may be known and predictable within a few feet or meters. In this way, the communications range may be limited to a current location of the mobile computing device 100. As an example, the mobile computing device 100 may be carried by a restaurant guest seated at a table in a restaurant. In this example, the communication range may be known to be limited within an area at and nearby the table. For other example, the communications module 104 may be another radio communication module covering a range from nearby the table or anywhere else with a restaurant or building. These examples should not be considered limiting as it should be understood that the communication range may be considered to include any suitable location, such as outside a restaurant in a parking lot or other location.

The item ordering manager 106 may be configured to receive an indication of one or more items for purchase and delivery to a location within the predetermined communication range. For example, the communications module 104 may be configured to activate when in range of another communications module (e.g., another NFC module) and may receive from the other communication module a restaurant menu of items for ordering at the restaurant. The indication of the item(s) may include text, graphical indicia, images, video, and/or the like associated with the menu items. In addition, the information provided to the communications module of the mobile computing device 100 may include health information such as, but not limited to, calories, vitamin content, ingredients, and the like. The item ordering manager 106 may control the user interface 108 to present to a user the indication of the item(s) and associated information. For example, the user interface 108 may include a touchscreen display 110 configured to display the indication of the item(s) and associated information.

The item ordering manager 106 may include hardware, software, firmware, or combinations thereof configured to implement the functions disclosed herein. For example, the item ordering manager 106 may include one or more processors and memory 107. In an example, the item ordering manager 106 may be an application (also referred to as an "app") residing on a smartphone or tablet computer. The application may be suitably initiated and interacted with by a user of the smartphone or tablet computer for implementing the functions described herein.

Upon receipt of the indication of item(s) for purchase and delivery, a user may view the items on the touchscreen display 110. In addition, the user may interact with the user interface 108 for selecting one of the items for purchase and delivery to the location within the predetermined communication range of the communications module 104. For example, the user may suitably interact with the touchscreen display 110 to select one or more of the items by touch at an appropriate location on the touchscreen display surface. In another example, the user may select one or more of the items via other input system using gesture, voice, etc. In response to the user input, the item ordering manager 106 can control the communication module 104 to communicate identification of the selected item(s) to another communications module within the predetermined communication range.

The centralized computing device 102 may include a communications module 104 and a centralized ordering manager 111 configured to use its communication module 104 to receive indication of a presence of one or more of the mobile computing devices 100 within the predetermined communication range, configured to use its communication module 104 to communicate to the mobile computing device (s) 100 an indication of one or more items for purchase and delivery to a location within the predetermined communication range, configured to use its communication module 104 to receive selection of one or more of the items for purchase and delivery to the location within the predetermined communication range, and configured to initiate a transaction with the mobile computing device(s) 100 for purchasing the selected item(s). For example, the centralized ordering manager 111 may include hardware, software, firmware, or combinations thereof for implementing the functionality described herein. As an example, the item ordering manager 111 may include one or more processors and memory 113.

Figure 2:
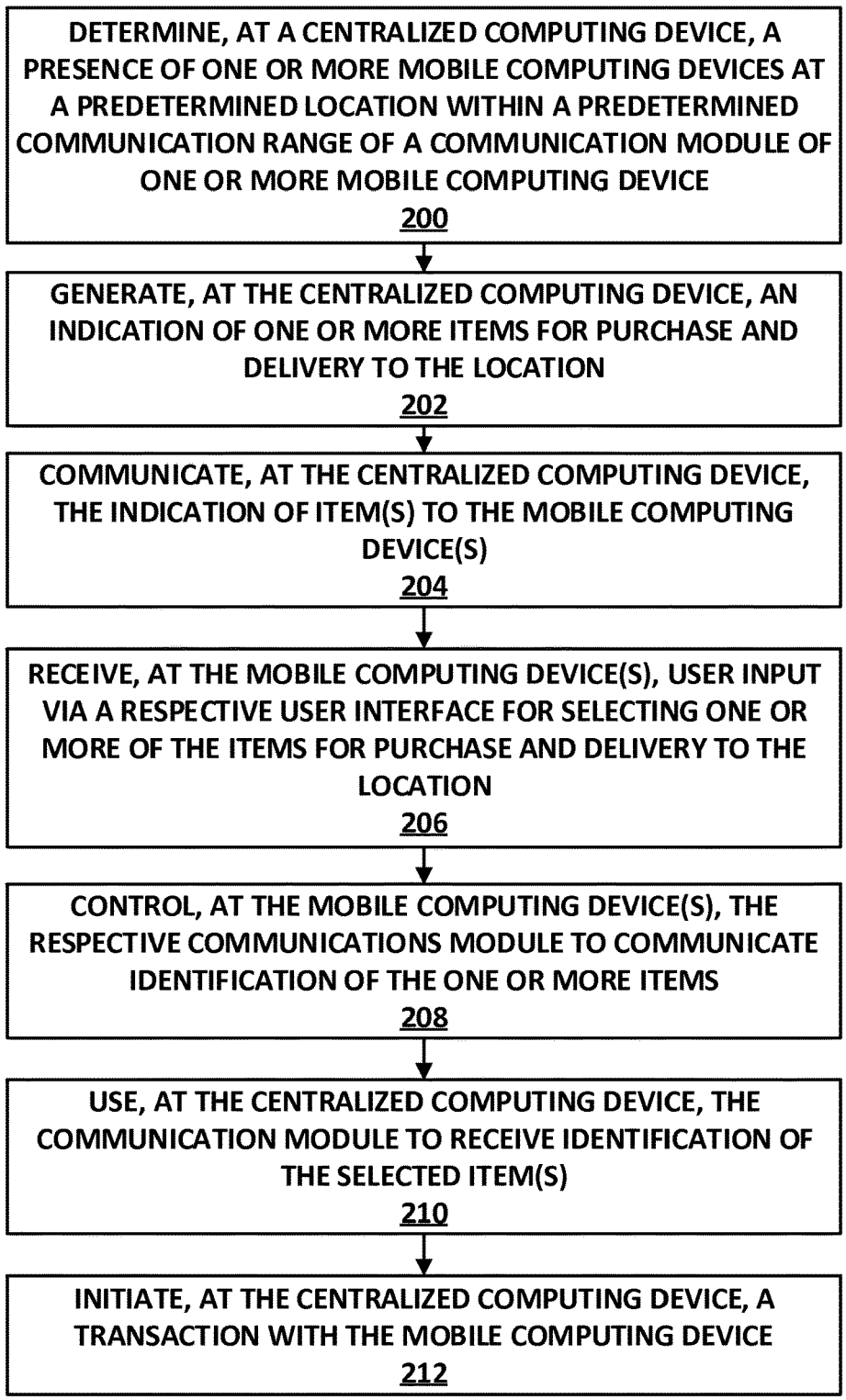
FIG. 2 is a flow chart of an example method for purchase of items and delivery to a location within a predetermined communication range in accordance with embodiments of the present disclosure.

FIG. 2 illustrates a flow chart of an example method for purchase of items and delivery to a location within a predetermined communication range in accordance with embodiments of the present disclosure. The method is described as being implemented by the system shown in FIG. 1, although it should be understood that the method may be implemented by any other suitable system.

Referring to FIG. 2, the method includes determining 200, at a centralized computing device, a presence of one or more mobile computing devices at a predetermined location within a predetermined communication range of a communications module of the mobile computing device(s). For example, the centralized computing device 102 may be configured to detect a presence of one or more of the mobile computing devices 100 when they are within range of the centralized computing device's 102 communications module 104. As a particular example, the communications module 104 may be an NFC module configured to determine the presence of another computing device with an activated NFC module as will be understood by those of skill in the art. The centralized ordering manager 111 of the centralized computing device 102 may be operatively configured with the NFC module to determine that the computing device(s) 100 are present based on the detection.

The method of FIG. 2 includes generating 202, at the centralized computing device, an indication of one or more items for purchase and delivery to the location. Continuing the aforementioned example, the centralized ordering manager 111 of the centralized computing device 102 may generate an indication of one or more items for purchase for delivery to the location within the range of the NFC module. As an example, a guest at a restaurant may carry a mobile computing device that is recognized when they sit at a table or otherwise arrive at a place where an order may be placed. In response to detecting the presence of the guest's mobile computing device, the centralized ordering manager 111 may generate a menu including an indication or identifier of appetizers, entrees, and beverages that may be ordered. As referred to herein, the term "generate" should be understood to mean that the centralized may either produce from any source or read one or more items from memory for communicating a list or other indication of items to one or more mobile computing devices. For example, a menu may be stored in memory and read by the centralized ordering manager 111 for subsequent communication to the mobile computing device 100. In another example, different items may be read from different source for producing a list or other indication of items that is unique for communication to the mobile computing device 100.

In accordance with embodiments of the present disclosure, a list or other indication of item(s) to send to a computing device may be generated based on the predetermined location, time, or other factor. For example, a menu sent to computing devices in one location may be different depending on a location of the computing device within a restaurant. In another example, the communicated menu may be different based on the time of day. For example, during the morning hours, a breakfast menu may be communicated to the computing device. In the evening hours for example, a dinner menu may be communicated to the computing device.

With continuing reference to FIG. 2, the method includes communicating 204, at the centralized computing device, the indication of items to the mobile computing device(s). Continuing the aforementioned example, the centralized ordering manager 111 may use its communications module 104 to communicate the menu to the detected mobile computing device(s). The communications module 104 may communicate the menu and any other information in a suitable format for presenting it at the receiving mobile computing device.

The method of FIG. 2 includes receiving 206, at the mobile computing device(s), user input via a respective user interface for selecting one or more of the items for purchase and delivery to the location. Continuing the aforementioned example, a user interface of a receiving mobile computer device 100 may be controlled by the item ordering manager 106 to present the menu to a user. The menu may be in a suitable format such that the indicated or listed items can be selected. For example, each item may be graphically presented at a particular area of the touchscreen display 110. To select an item, the user may touch the area of the touchscreen display 110 that corresponds to the item. The user may also otherwise interact with the user interface 108 to select other items and enter a command to communicate the item selection for placing the order.

The method of FIG. 2 includes using 208, at the mobile computing device(s), the respective communications module to communicate identification of the one or more of the items to a communications module of the centralized computing device. Continuing the aforementioned example, the item ordering manager 106 of one or more of the computing devices 100 may user their respective communications modules 104 to send identifications of selected items to the communication module 104 of the centralized computing device 102.

The method of FIG. 2 includes using 210, at the centralized computing device, the communications module to receive identification of the selected item(s). Continuing the aforementioned example, the centralized ordering manager 111 may receive and store the item identifications in memory.

The method of FIG. 2 includes initiating 212, at the centralized computing device, a transaction with the mobile computing device for purchasing the one or more selected items. For example, the centralized computing device 102 may present selected items and identification of the location for delivery to a user via its user interface 108. In addition, the centralized computing device 102 may be configured with suitable purchase transaction functionality for processing the order and payment.

In accordance with embodiments of the present subject matter, item orders may be generated and communicated to a centralized computing device from multiple mobile computing devices at the same location or within a common area of range of their communications modules. In this example, the orders for the different items may be separately processed in different purchase transactions. In addition to an item order from each mobile computing device, the mobile computing devices may each communicate respective identifiers so that the different orders may be associated with respective devices. Subsequently, purchase transactions for the orders may be separately conducted with respective computing devices.

Figure 3:
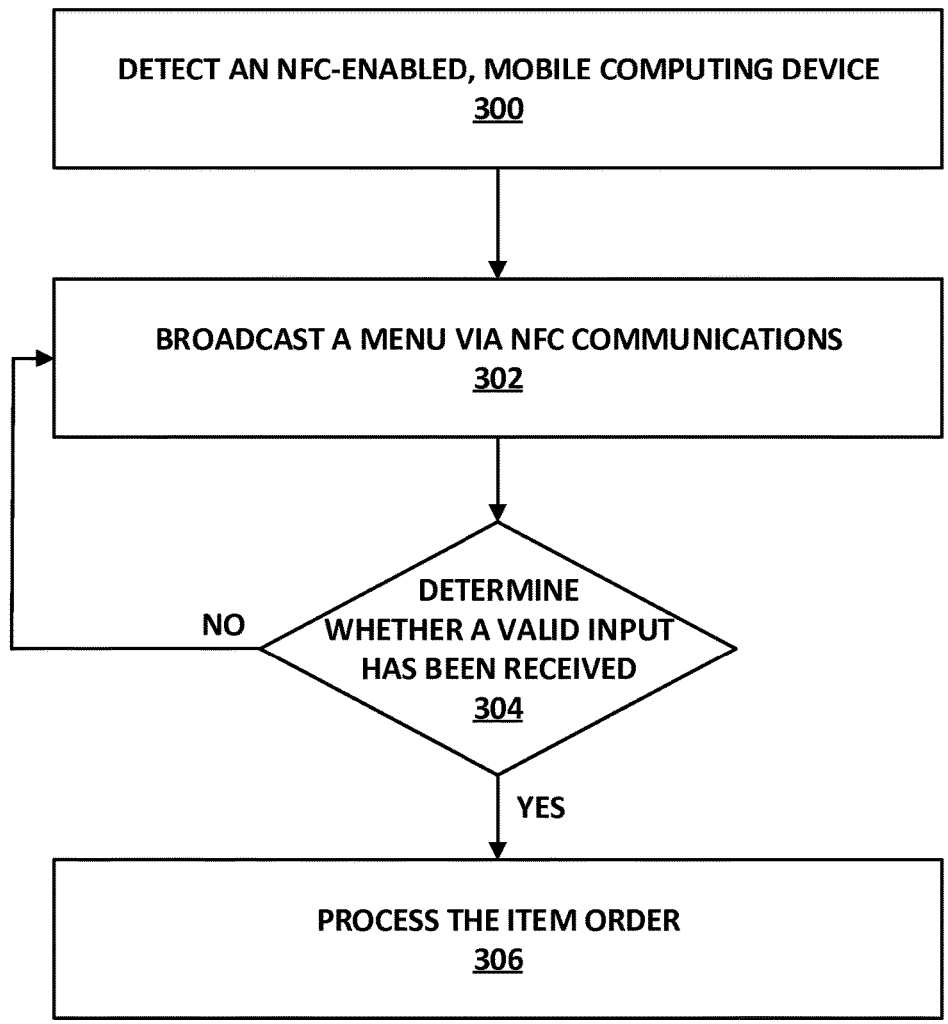
FIG. 3 is a flow chart of another example method purchase of items and delivery to a location within a predetermined communication range in accordance with embodiments of the present disclosure.

FIG. 3 illustrates a flow chart of another example method purchase of items and delivery to a location within a predetermined communication range in accordance with embodiments of the present disclosure. The method is described as being implemented by a centralized computing device 102 as shown in FIG. 1, although it should be understood that the method may be implemented by any other suitable computing device.

Referring to FIG. 3, the method includes detecting 300 an NFC-enabled, mobile computing device. For example, the communications module 104 of the centralized computing device 102 may be an NFC module configured to detect one or more NFC-enabled mobile computing devices 100 within range of communication. The NFC module may, upon the detection, communicate an indication of the detection to the item ordering manager 106.

The method of FIG. 3 includes broadcasting 302 a menu via NFC communications. Continuing the aforementioned example, the centralized ordering manager 111 may generate or retrieve a menu for communication to the detected NFC-enabled mobile computing device. The centralized ordering manager 111 may control the communications module 104 to broadcast the menu via any suitable NFC broadcast technique. The menu may subsequently be received by NFC-enabled mobile computing devices within communication range.

The method of FIG. 3 includes determining 304 whether a valid input has been received. Continuing the aforementioned example, the communications module 104 of a nearby mobile computing device 100 may listen for NFC communications, such as the broadcasted menu. In response to receipt of the broadcasted menu, item selection may be entered and communicated at the receiving mobile computing device 100 as described herein. The centralized ordering manager 111 of the centralized computing device 102 may wait until receipt of a communicated item selection. In response to no communication being received, the centralized computing device 102 may broadcast the menu 302. In response to receipt of the item selection, the method may proceed to block 306.

At block 306, the method includes processing 306 the item order. Continuing the aforementioned example, the centralized computing device 102 may initiate a transaction with the mobile computing device 100 for purchasing the selected items. Further, the centralized computing device 102 may present selected items and identification of the location for delivery to a user via its user interface 108. In addition, the centralized computing device 102 may implement purchase transaction functionality for processing the order and payment.

Figure 4:
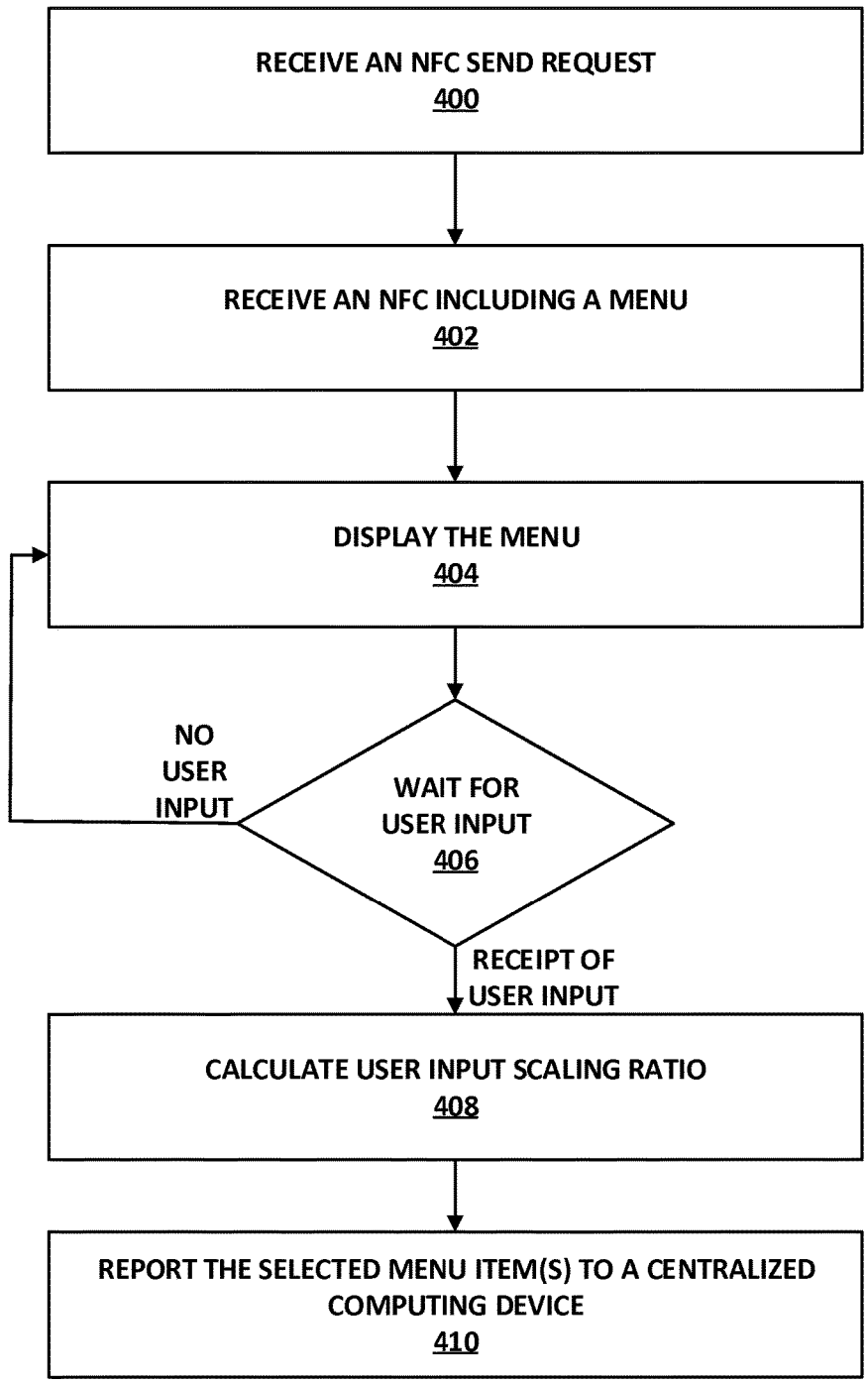
FIG. 4 is a flow chart of another example method purchase of items and delivery to a location within a predetermined communication range in accordance with embodiments of the present disclosure.

FIG. 4 illustrates a flow chart of another example method purchase of items and delivery to a location within a predetermined communication range in accordance with embodiments of the present disclosure. The method is described as being implemented by one of the mobile computing device 100 as shown in FIG. 1, although it should be understood that the method may be implemented by any other suitable computing device.

Referring to FIG. 4, the method includes receiving 400 an NFC send request. For example, one of the mobile computing devices 100 can receive an NFC send request from the centralized computing device 102. In response the receiving mobile computing device 100 can send an acknowledgement communication to the centralized computing device 102 for accepting the request. Subsequently, the method includes receiving 402 an NFC including a menu.

The method of FIG. 4 includes displaying 404 the menu and waiting 406 for user input. Continuing the aforementioned example, the mobile computing device 100 can display the menu via the touchscreen display 110 and wait for user input to the touchscreen display 110. The mobile computing device can continue to display the menu at block 404 until receipt of user input for selecting one or more of the items in the menu. In response to receipt of the user input, the method proceeds to block 408.

At block 408, the method includes calculating user input scaling ratio. Continuing the aforementioned example, the mobile computing device 100 may implement this step so that a menu is presented in a readable form to the user. In a particular example, the mobile computing device 100 can calculate the user input scaling ratio to account for the difference in the mobile computing device's 100 display aspect ratio (represented as "x" for the horizontal aspect, and "y" for the vertical aspect) and the aspect ratio of the menu (represented as "a" for the horizontal aspect, and "b" for the vertical aspect). The scaling ratio may be represented by the following equation: $x1/x*a$, $y1/y*b$. Subsequently, the method includes reporting 410 the selected menu item(s) to the centralized computing device 102 for processing in accordance with embodiments disclosed herein.

In accordance with embodiments of the present disclosure, a menu, list, or other indication of items for purchase and delivery may be communicated bi-directionally between a mobile computing device and another computing device, such as a centralized computing device. Further, a menu, list, or other indication of items for purchase and delivery can provide various functionality including, but not limited to, an ordering status (e.g., active/completed), estimated time to receive an order, call help, payment selection (e.g., one check, split check, cash, credit card, e-wallet, and the like), tip calculator, or the like.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain embodiments have been described, these embodiments have been presented by way of example only, and are not intended to limit the scope of the inventions. Indeed, the novel methods, devices, and systems described herein may be embodied in a variety of other forms. Furthermore, various omissions, substitutions, and changes in the form of the methods, devices, and systems described herein may be made without departing from the spirit of the inventions. The accompanying claims and their equivalents are intended to cover such forms or modifications as would fall within the scope and spirit of the inventions.

What is claimed:

1. A mobile computing device comprising:
    at least a processor and memory;
    a first communications module, executed by the processor, configured to receive identification of one or more items for purchase and delivery to a location within a predetermined communication computing range;
    a user interface configured to present the identification of the one or more items; and
    an item ordering manager, executed by the processor, wherein the item ordering manager is configured to:
        receive user input via the user interface for selecting one or more of the items for purchase and delivery to the location within the predetermined communication computing range;
        display, via the user interface, graphical information about the one or more items based on the location of the mobile computing device within the predetermined communication computing range and a predetermined time of day;
        determine a user input scaling ratio, wherein the user input scaling ratio comprises a value that accounts for a difference in an aspect ratio of the graphical information and an aspect ratio of the mobile computing device;
        apply the user input scaling ratio to the mobile computing device aspect ratio and the displayed graphical information aspect ratio;
        display the one or more items based on the applied user input scaling ratio and the displayed graphical information aspect ratio; and
        use the first communications module to communicate identification of the one or more of the items to a second communications module within the predetermined communication computing range.

2. The mobile computing device of claim 1, wherein the first communications module and second communications module each comprises a near field communications (NFC) module.

3. The mobile computing device of claim 1, wherein the item ordering manager is configured to:
    receive a communication request from the second communications module;
    send an acknowledgement to the second communications module for accepting the request;
    receive information from the second communications module; and
    display, via the user interface, the information to a user.

4. The mobile computing device of claim 1, wherein the user interface comprises a touchscreen display, and
    wherein the item ordering manager is configured to:
        display, via the touchscreen display, the identification of the one or more items;
        display, via the user interface, graphical information about the one or more items; and receive user touch input for selecting at least one of the items.

5. The mobile computing device of claim 1, wherein the one or more items comprise restaurant menu items.

6. The mobile computing device of claim 1, wherein the item ordering manager is configured to conduct a transaction for purchasing the one or more selected items.

7. A system comprising:
at least a processor and memory;
a communications module, executed by the processor, having a predetermined communication computing range; and
a centralized ordering manager, executed by the processor, configured to:
use the communication module to receive indication of a presence of a mobile computing device within the predetermined communication computing range;
use the communication module to communicate to the mobile computing device indication of one or more items for purchase and delivery to a location within the predetermined communication computing range;
use the communication module to:
receive selection of one or more of the items for purchase and delivery to the location within the predetermined communication computing range;
display graphical information about the one or more items based on the location of the mobile computing device within the predetermined communication computing range and a predetermined time of day;
determine a user input scaling ratio, wherein the user input scaling ratio comprises a value that accounts for a difference in the aspect ratio of the graphical information and a aspect ratio of the mobile computing device;
apply the user input scaling ratio to the mobile computing device aspect ratio and the displayed graphical information aspect ratio;
display the one or more items based on the applied user input scaling ratio and the displayed graphical information aspect ratio; and
initiate a transaction with the mobile computing device for purchasing the one or more selected items.

8. The system of claim 7, wherein the communications module is a first communications module,
wherein the mobile computing device comprises a second communications module, and
wherein the first communications module and second communications module each comprises a near field communications (NFC) module.

9. The system of claim 7, wherein the centralized ordering manager is configured to communicate, to the mobile computing device, information that the communications module is a near field communications (NFC) interface for purchasing the items for delivery to the location within the predetermined communication computing range.

10. The system of claim 7, wherein the items comprise restaurant menu items.

11. The system of claim 7, wherein the centralized ordering manager is configured to:
determine the location of the mobile computing device; and
generate the indication of the one or more items based on the location.

12. A method comprising:
receiving identification of one or more items for purchase and delivery to a location within a predetermined communication computing range of a mobile computing device;
presenting the identification of the one or more items;
receiving user input for selecting one or more of the items for purchase and delivery to the location within the predetermined communication computing range;
displaying graphical information about the one or more items based on the location of the mobile computing device within the predetermined communication computing range and a predetermined time of day;
determining a user input scaling ratio, wherein the user input scaling ratio comprises a value that accounts for a difference in the aspect ratio of the graphical information and a aspect ratio of the mobile computing device;
applying the user input scaling ratio to adjust a difference in an orientation of the mobile computing device aspect ratio and the displayed graphical information aspect ratio;
displaying the one or more items based on the applied user input scaling ratio and the displayed graphical information aspect ratio; and
communicating identification of the one or more of the items to a communications module within the predetermined communication computing range.

13. The method of claim 12, wherein the communications module comprises a near field communications (NFC) module.

14. The method of claim 12, further comprising:
receiving information from the communications module that indicates that the communications module is an interface for purchasing the items for delivery to the location within the predetermined communication computing range; and
displaying, via the user interface the information to a user.

15. The method of claim 12, further comprising displaying, via the user interface the information about the items.

16. The method of claim 12, further comprising:
displaying, via a touchscreen display the identification of the one or more items;
displaying, via a user interface graphical information about the one or more items; and
receiving, at the touchscreen display, user touch input for selecting at least one of the items.

17. The method of claim 12, wherein the items comprise restaurant menu items.

18. The method of claim 12, further comprising conducting a transaction for purchasing the one or more selected items.

* * * * *